(12) United States Patent
Ogawa et al.

(10) Patent No.: US 11,041,450 B2
(45) Date of Patent: Jun. 22, 2021

(54) VEHICLE CONTROL DEVICE

(71) Applicant: Mazda Motor Corporation, Hiroshima (JP)

(72) Inventors: Daisaku Ogawa, Hiroshima (JP); Osamu Sunahara, Hiroshima (JP); Yasunori Takahara, Hiroshima (JP); Chikako Ohisa, Aki-gun (JP); Yuichiro Akiya, Hiroshima (JP); Atsushi Yamasaki, Hiroshima (JP); Keiichi Hiwatashi, Aki-gun (JP); Daisuke Umetsu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/489,384

(22) PCT Filed: Mar. 9, 2018

(86) PCT No.: PCT/JP2018/009225
§ 371 (c)(1),
(2) Date: Aug. 28, 2019

(87) PCT Pub. No.: WO2018/168693
PCT Pub. Date: Sep. 20, 2018

(65) Prior Publication Data
US 2019/0390612 A1     Dec. 26, 2019

(30) Foreign Application Priority Data
Mar. 17, 2017  (JP) .............................. JP2017-052427

(51) Int. Cl.
*F02D 17/02*   (2006.01)
*B60W 10/06*   (2006.01)
*F02D 41/00*   (2006.01)

(52) U.S. Cl.
CPC ............. *F02D 17/02* (2013.01); *B60W 10/06* (2013.01); *B60W 2520/20* (2013.01);
(Continued)

(58) Field of Classification Search
CPC ............. B60W 10/06; B60W 2520/20; B60W 2520/26; B60W 2540/18; F02D 17/02;
(Continued)

(56) References Cited

U.S. PATENT DOCUMENTS

2009/0222197 A1   9/2009   Moriya
2015/0191168 A1*  7/2015   Mitsuyasu ............ F02D 29/02
                                                      701/54

FOREIGN PATENT DOCUMENTS

JP   5-149181 A   6/1993
JP   10-73033 A   3/1998
(Continued)

OTHER PUBLICATIONS

International Search Report and Written Opinion dated Apr. 17, 2018 for PCT/JP2018/009225 filed on Mar. 9, 2018, 8 pages including English Translation of the International Search Report.

*Primary Examiner* — Phutthiwat Wongwian
*Assistant Examiner* — Diem T Tran
(74) *Attorney, Agent, or Firm* — Xsensus LLP

(57) ABSTRACT

A vehicle control device includes an engine 10 capable of switching between reduced-cylinder operation and all-cylinder operation, an engine control mechanism that controls an engine torque, and a PCM 50 that executes vehicle posture control for generating vehicle deceleration by controlling the engine control mechanism to reduce the engine torque upon satisfaction of a condition that a vehicle is travelling and a steering angle-related value related to a steering angle of a steering device increases. In addition, this PCM 50 permits the execution of the vehicle posture control (Continued)

when an engine rotation speed is more than or equal to a first rotation speed Ne1 and permits the execution of the reduced-cylinder operation of the engine 10 when the engine rotation speed is more than or equal to a second rotation speed Ne2 that is more than the first rotation speed Ne1.

20 Claims, 11 Drawing Sheets

(52) U.S. Cl.
CPC ..... *B60W 2520/26* (2013.01); *B60W 2540/18* (2013.01); *F02D 2041/0012* (2013.01); *F02D 2250/21* (2013.01)

(58) Field of Classification Search
CPC ....... F02D 2041/0012; F02D 2041/002; F02D 2200/50; F02D 2250/21; F02D 41/0087; F02D 41/021
See application file for complete search history.

(56) References Cited

FOREIGN PATENT DOCUMENTS

| | | |
|---|---|---|
| JP | 2006-183638 A | 7/2006 |
| JP | 2009-203900 A | 9/2009 |
| JP | 2014-166014 A | 9/2014 |

\* cited by examiner

VEHICLE CONTROL DEVICE

CROSS-REFERENCE TO RELATED APPLICATIONS

The present application is based on PCT filing PCT/JP2018/009225, filed Mar. 9, 2018, which claims priority to JP 2017-052427, filed Mar. 17, 2017, the entire contents of each are incorporated herein by reference.

TECHNICAL FIELD

The present invention relates to a vehicle control device and, more particularly, to a vehicle control device that achieves a desired vehicle posture (vehicle behavior) by executing engine control.

BACKGROUND ART

There is a conventionally known technique (for example, a side slip prevention device) that controls the behavior of a vehicle in a safe direction when the behavior of the vehicle becomes unstable due to a slip or the like. Specifically, there is a known technique that detects occurrence of understeer or oversteer behavior in the vehicle when, for example, the vehicle corners and provides the vehicle with appropriate deceleration so as to suppress the behavior.

On the other hand, there is a known vehicle motion control device that adjusts loads applied to front wheels that are steering wheels by adjusting deceleration during cornering so that a series of the driver's operations (such as braking, steering, acceleration, and releasing of steering) when a vehicle in normal travel states corners becomes natural and stable, unlike control for improving safety in travel states in which vehicle behavior becomes unstable as described above.

In addition, there is proposed a vehicle behavior control device that immediately generates deceleration in a vehicle when the driver starts a steering operation by reducing the vehicle driving force (torque) according to yaw rate-related amounts (for example, yaw acceleration) corresponding to the driver's steering operation so as to apply sufficient loads to the front wheels that are steering wheels (see, for example, patent document 1). This vehicle behavior control device increases the friction force between the front wheels and the road surface by immediately applying loads to the front wheels at the start of a steering operation and increases the cornering force of the front wheels, thereby improving the head turn-around property of the vehicle at the initial stage when entering a curve and a response (that is, steering stability) to a steering operation. This achieves vehicle behavior as intended by the driver.

CITATION LIST

Patent Literature

PTL 1: JP-A-2014-166014

SUMMARY OF INVENTION

Technical Problem

By the way, there is a conventionally known technique that switches an operation mode between all-cylinder operation that performs combustion of air-fuel mixtures in all cylinders and reduced-cylinder operation that stops combustion of air-fuel mixtures in some of cylinders according to the operational state of a vehicle in order to improve fuel economy and the like in a multicylinder engine having a plurality of cylinders. As described above, in reduced-cylinder operation of a cylinder deactivation engine capable of performing reduced-cylinder operation, combustion is prohibited in cylinders having discontinuous turns of combustion and combustion is sequentially performed in the remaining cylinders. Therefore, the combustion interval (explosion interval) of reduced-cylinder operation becomes longer than that of all-cylinder operation.

Accordingly, when the above control (vehicle posture control) that reduces the engine torque so as to generate vehicle deceleration according to the steering operation is applied to a cylinder deactivation engine, the following problems may occur. Between all-cylinder operation and reduced-cylinder operation, there is a difference in time from when a torque reduction request in vehicle posture control occurs to the time when the cylinder combustion timing first arrives and vehicle posture control actually starts.

Accordingly, when vehicle posture control is performed during reduced-cylinder operation, the response of torque reduction by vehicle posture control tends to be worse than when vehicle posture control is performed during all-cylinder operation. As a result, the timing at which the cornering force of the front wheels increases due to the reduction of the engine torque and the timing at which the reaction force of the steering increases according to the increase of the cornering force are delayed and desired vehicle behavior is not achieved at the time of turning, thereby giving a sense of discomfort to the driver.

In particular, the above degradation in the response of torque reduction is remarkable in the low rotation speed region of the engine. This is because, in the low rotation speed region, the number of engine combustions per unit time reduces, that is, the combustion interval increases.

The present invention addresses the above problems of the prior art with an object of providing a vehicle control device capable of appropriately suppressing the degradation of the response of vehicle posture control because reduced-cylinder operation is performed during the vehicle posture control in the low rotation speed region of the engine.

Solution to Problem

To achieve the above object, according to the present invention, there is provided a vehicle control device including an engine having a plurality of cylinders, the engine being capable of switching between reduced-cylinder operation that stops combustion in some of the cylinders and all-cylinder operation that performs combustion in all of the cylinders; an engine control mechanism that controls a generated torque of the engine; and control means that performs vehicle posture control for generating vehicle deceleration by controlling the engine control mechanism to reduce the generated torque of the engine upon satisfaction of a condition that a vehicle is travelling and a steering angle-related value related to a steering angle of a steering device increases, in which the control means gives permission of execution of the vehicle posture control when a rotation speed-related value related to a rotation speed of the engine is more than or equal to a first predetermined value and gives permission of execution of the reduced-cylinder operation of the engine when the rotation speed-related value is more than or equal to a second predetermined value that is more than the first predetermined value.

According to the present invention configured as described above, the execution of the vehicle posture control is permitted when the rotation speed-related value is more than or equal to the first predetermined value and the execution of the reduced-cylinder operation is permitted when the rotation speed-related value is more than or equal to the second predetermined value (>the first predetermined value). Therefore, the execution of the reduced-cylinder operation can be appropriately limited in the operation region in which the rotation speed-related value is more than or equal to the first predetermined value and less than the second predetermined value, that is, the low rotation speed region in which the execution of the vehicle posture control is permitted. As a result, the reduced-cylinder operation is executed during the vehicle posture control in the low rotation speed region in which the combustion interval is large, so the degradation of the response of the vehicle posture control can be suppressed appropriately. That is, the response of the vehicle posture control in the low rotation speed region can be ensured.

According to the present invention, when a state in which the rotation speed-related value is more than or equal to the first predetermined value and less than the second predetermined value and the vehicle posture control is under execution is changed to a state in which the rotation speed-related value is more than or equal to the second predetermined value, preferably, the control means limits the permission of the execution of the reduced-cylinder operation until the execution of the vehicle posture control ends.

According to the present invention configured as described above, when the rotation speed-related value changes from a value less than the second predetermined value to a value more than or equal to the second predetermined value during the vehicle posture control, the permission of the execution of the reduced-cylinder operation is limited until the execution of the vehicle posture control ends. Therefore, if the vehicle posture control is under execution even when the rotation speed-related value is more than or equal to the second predetermined value, the execution of the reduced-cylinder operation during the vehicle posture control can be appropriately limited and the degradation of the response of the vehicle posture control can be suppressed effectively. In particular, although the engine is controlled to restore the generated torque of the engine to the torque before the execution of the vehicle posture control when ending the vehicle posture control, the present invention described above can appropriately suppress the degradation of the response of torque restoration by executing the reduced-cylinder operation at this time.

According to the present invention, when a state in which the rotation speed-related value is more than or equal to the second predetermined value and the vehicle posture control and the reduced-cylinder operation are executed is changed to a state in which the rotation speed-related value is less than the second predetermined value, preferably, the control means limits transition from the reduced-cylinder operation to the all-cylinder operation of the engine until the execution of the vehicle posture control ends.

According to the present invention configured as described above, even when the rotation speed-related value changes from a value more than or equal to the second predetermined value to a value less than the second predetermined value, if the vehicle posture control is under execution at the time of this change, transition from the reduced-cylinder operation to the all-cylinder operation is limited until the execution of the vehicle posture control ends. This can appropriately suppress occurrence of a torque shock by executing engine control for switching from the reduced-cylinder operation to the all-cylinder operation when engine control for restoring the torque is performed at the end of the vehicle posture control.

According to the present invention, when the rotation speed-related value is more than or equal to a third predetermined value that is more than the second predetermined value, preferably, the control means permits the number of the cylinders in which combustion is stopped in the reduced-cylinder operation to become larger than when the rotation speed-related value is more than or equal to the second predetermined value and less than the third predetermined value.

According to the present invention configured as described above, the number of stopped cylinders can be appropriately increased according to the rotation speed-related value, thereby improving the reduction effect of pumping loss due to the reduced-cylinder operation. As a result, fuel economy can be improved effectively.

According to the present invention, preferably, the control means changes the second predetermined value according to an accelerator opening-related value related to an opening of an accelerator pedal.

According to the present invention, preferably, the vehicle control device further includes rotation speed detection means that detects the rotation speed of the engine, in which the control means uses, as the rotation speed-related value, the rotation speed detected by the rotation speed detection means.

According to the present invention, preferably, the vehicle control device further includes a steering angle sensor that detects a steering angle of the steering device, in which the control means decides that the steering angle-related value increases when a change speed of the steering angle detected by the steering angle sensor is more than or equal to a predetermined speed.

According to another aspect of the present invention, there is provided a vehicle control device including an engine having a plurality of cylinders, the engine being capable of switching between reduced-cylinder operation that stops combustion in some of the cylinders and all-cylinder operation that performs combustion in all of the cylinders; an engine control mechanism that controls a generated torque of the engine; and control means that performs vehicle posture control for generating vehicle deceleration by controlling the engine control mechanism to reduce the generated torque of the engine upon satisfaction of a condition that a vehicle is travelling and a steering angle-related value related to a steering angle of a steering device increases, in which the control means permits execution of the vehicle posture control when a rotation speed-related value related to the rotation speed of the engine increases to a value more than or equal to a first predetermined value and gives permission of execution of the reduced-cylinder operation of the engine when the rotation speed-related value increases to a value more than or equal to a second predetermined value that is more than the first predetermined value.

According to the present invention configured as described above, the degradation of the response of the vehicle posture control can be appropriately suppressed by executing the reduced-cylinder operation during the vehicle posture control in the low rotation speed region in which the combustion interval is large.

According to another aspect of the present invention, there is provided a vehicle control device including an engine having a plurality of cylinders, the engine being capable of switching between reduced-cylinder operation that stops combustion in some of the cylinders and all-cylinder operation that performs combustion in all of the cylinders; an engine control mechanism that controls a generated torque of the engine; and control means that performs vehicle posture control for generating vehicle deceleration by controlling the engine control mechanism to reduce the generated torque of the engine upon satisfaction of a condition that a vehicle is travelling and a steering angle-related value related to a steering angle of a steering device increases, in which the control means performs the vehicle posture control when a rotation speed-related value related to the rotation speed of the engine is more than or equal to a first predetermined value and performs the reduced-cylinder operation of the engine when the rotation speed-related value is more than or equal to a second predetermined value that is more than the first predetermined value.

According to the present invention configured as described above, the degradation of the response of the vehicle posture control can be appropriately suppressed by executing the reduced-cylinder operation during the vehicle posture control in the low rotation speed region of the engine.

According to another aspect of the present invention, there is provided a vehicle control device including an engine having a plurality of cylinders, the engine being capable of switching between reduced-cylinder operation that stops combustion in some of the cylinders and all-cylinder operation that performs combustion in all of the cylinders; an engine control mechanism that controls a generated torque of the engine; and control means that performs vehicle posture control for generating vehicle deceleration by controlling the engine control mechanism to reduce the generated torque of the engine upon satisfaction of a condition that a vehicle is travelling and a steering angle-related value related to a steering angle of a steering device increases, in which the control means performs the vehicle posture control when a value related to a combustion interval of the engine is less than a first predetermined value and performs the reduced-cylinder operation of the engine when the value related to the combustion interval is less than a second predetermined value that is less than the first predetermined value.

According to the present invention configured as described above, the execution of the vehicle posture control is permitted when the value related to the combustion interval is less than the first predetermined value and the execution of the reduced-cylinder operation is permitted when the value related to the combustion interval is less than the second predetermined value (<the first predetermined value). Therefore, the execution of the reduced-cylinder operation can be appropriately limited in the operation region in which the value related to the combustion interval is more than or equal to the second predetermined value and less than the first predetermined value, that is, in the region having a relatively large combustion interval in which the execution of the vehicle posture control is permitted. As a result, the degradation of the response of vehicle posture control can be appropriately suppressed by executing the reduced-cylinder operation during the vehicle posture control when the combustion interval of the engine is large (low rotation speed region).

Advantageous Effects of Invention

In the vehicle control device according to the present invention, the degradation of the response of the vehicle posture control can be appropriately suppressed by executing reduced-cylinder operation during the vehicle posture control in the low rotation speed region of the engine.

DESCRIPTION OF EMBODIMENTS

Vehicle control devices according to embodiments of the present invention will be described below with reference to the attached drawings.

<System Structure>

Figure 1:
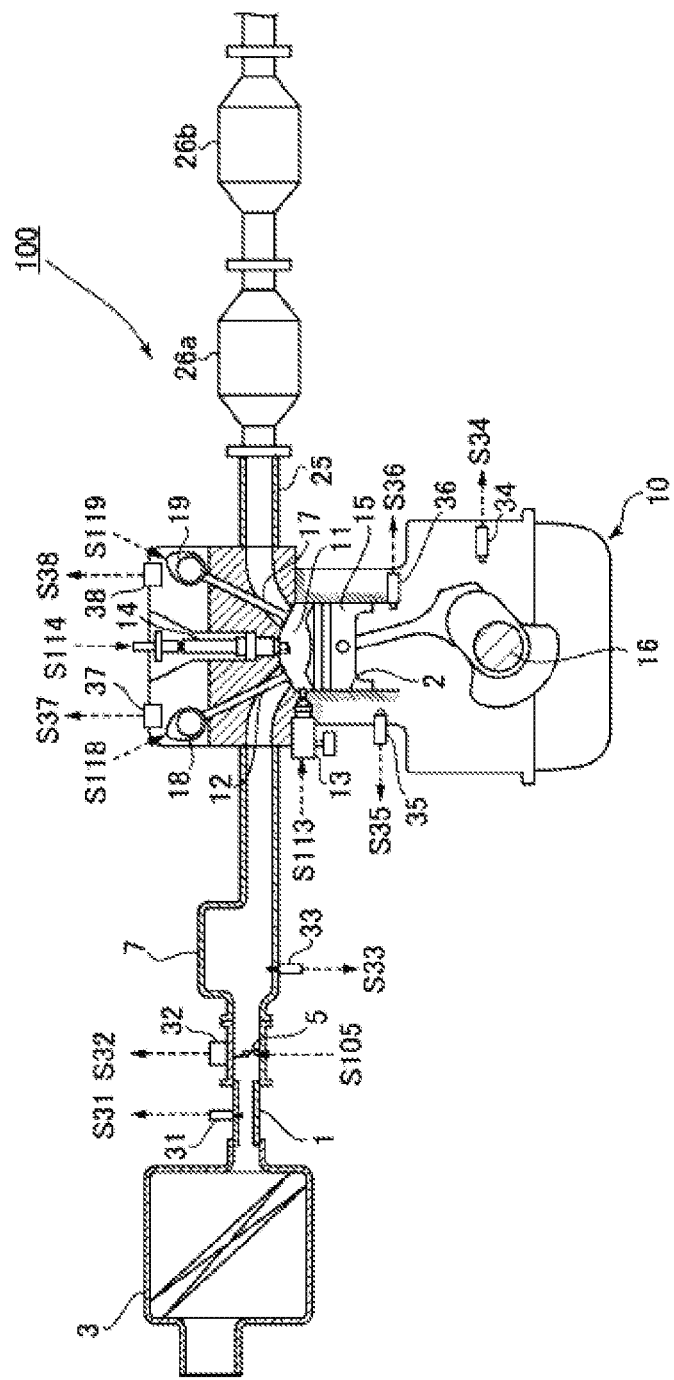
FIG. 1 is a schematic structural diagram illustrating an engine system to which a vehicle control device according to an embodiment of the present invention has been applied.
Figure 2:
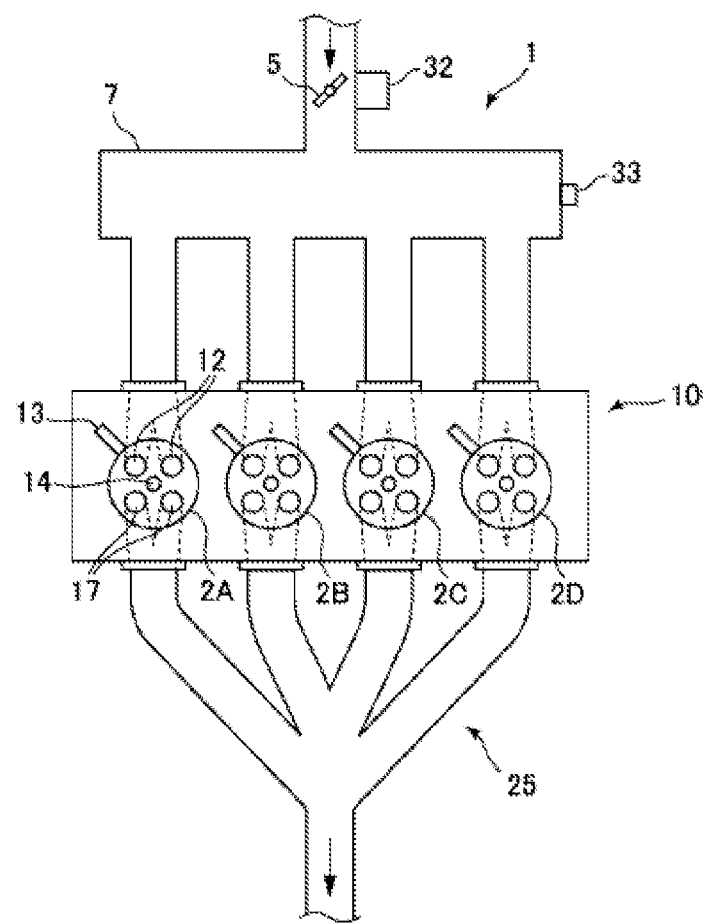
FIG. 2 is a schematic plan view illustrating an engine according to the embodiment of the present invention.
Figure 3:
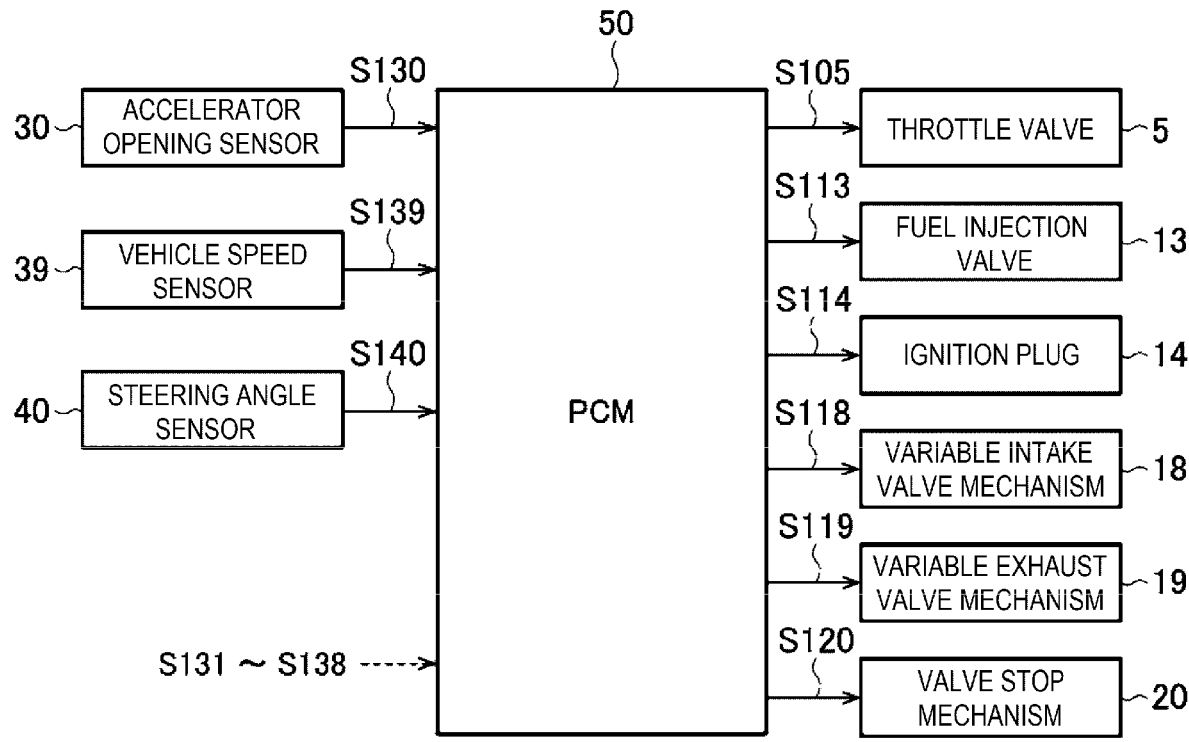
FIG. 3 is a block diagram illustrating an electric structure of the vehicle control device according to the embodiment of the present invention.

First, an engine system to which the vehicle control device according to an embodiment of the present invention has been applied will be described with reference to FIG. 1 to FIG. 3. FIG. 1 is a schematic structural diagram illustrating the engine system to which the vehicle control device according to the embodiment of the present invention has been applied. FIG. 2 is a schematic plan view illustrating an engine according to the embodiment of the present invention. FIG. 3 is a block diagram illustrating the electric structure of the vehicle control device according to the embodiment of the present invention.

As illustrated in FIG. 1 and FIG. 3, an engine system 100 mainly includes an intake passage 1 through which intake air (air) introduced from the outside passes, an engine 10 (specifically, a gasoline engine) that burns an air-fuel mixture of the intake air supplied through the intake passage 1 and fuel supplied through a fuel injection valve 13, which will be described later, and generates the power of a vehicle, an exhaust passage 25 through which exhaust gas generated by combustion in the engine 10 is exhausted, sensors 30 to 40 that detect various states about the engine system 100, and a PCM (Power-train Control Module) 50 that controls the entire engine system 100.

In the intake passage 1, an air cleaner 3 that purifies the intake air introduced from the outside, a throttle valve 5 that adjusts the amount (intake air amount) of the intake air passing therethrough, and a surge tank 7 that temporarily stores the intake air to be supplied to the engine 10 are disposed in this order from the upstream side.

As illustrated in FIG. 2, the engine 10 in the embodiment is an inline four-cylinder engine having four cylinders 2 (2A to 2D) arranged linearly. This engine 10 mainly includes intake valves 12 that introduce the intake air supplied through the intake passage 1 into combustion chambers 11, the fuel injection valves 13 that inject fuel toward the combustion chambers 11, ignition plugs 14 that ignite the air-fuel mixtures of the intake air and the fuel supplied into the combustion chambers 11, pistons 15 that reciprocate due to the combustion of the air-fuel mixtures in the combustion chambers 11, a crankshaft 16 that rotates due to the reciprocating motion of the pistons 15, and exhaust valves 17 through which the exhaust gas generated by the combustion of the air-fuel mixtures in the combustion chambers 11 is exhausted to the exhaust passage 25.

The pistons 15 provided in the cylinders 2A to 2D reciprocate with a phase difference of 180° (180° CA) of the crank angle. The ignition timings of the cylinders 2A to 2D deviate from each other in phase by 180° CA so as to correspond to this phase difference.

The engine 10 according to the embodiment is a cylinder deactivation engine capable of executing operation (that is, reduced-cylinder operation) in which two of the four cylinders 2A to 2D are stopped and the remaining two are operated.

Specifically, when the cylinder 2A is assumed to be a first cylinder, the cylinder 2B is assumed to be a second cylinder, the cylinder 2C is assumed to be a third cylinder, and the cylinder 2D is assumed to be a fourth cylinder from the left side in FIG. 2, ignition is performed in the order of the first cylinder 2A, the third cylinder 2C, the fourth cylinder 2D, and the second cylinder 2B in all-cylinder operation (all-cylinder operation mode) in which all of the four cylinders 2A to 2D are operated.

In addition, in the reduced-cylinder operation (reduced-cylinder operation mode), the ignition operation of the ignition plugs 14 is prohibited in two cylinders (the first cylinder 2A and the fourth cylinder 2D in the embodiment) having discontinuous turns of ignition and ignition is performed alternately in the remaining two cylinders (that is, the third cylinder 2C and the second cylinder 2B).

In addition, the engine 10 is configured so that the operation timings (corresponding to the phases of valves) of the intake valves 12 and the exhaust valves 17 can be changed by variable intake valve mechanisms 18 and variable exhaust valve mechanisms 19 as variable valve timing mechanisms. Various known types can be applied as the variable intake valve mechanisms 18 and the variable exhaust valve mechanisms 19. The operation timings of the intake valves 12 and the exhaust valves 17 can be changed by, for example, mechanisms configured electromagnetically or hydraulically.

In addition, the engine 10 has a valve stop mechanism 20 that stops the opening and closing operation of the intake valves 12 and the exhaust valves 17 of the first cylinder 2A and the fourth cylinder 2D in the reduced-cylinder operation. The valve stop mechanism 20 includes so-called lost motion mechanisms that are present between, for example, cams and valves and enable or disable the transmission of driving forces from the cams to the valves. Alternatively, the valve stop mechanism 20 may include so-called cam shifting mechanisms that include two types of cams having different cam profiles including a first cam that has a cam ridge for opening and closing the valves and a second cam that stops the opening and closing operation of the valves and selectively transmit, to the valves, the operational state of one of the first and second cams.

The exhaust passage 25 is mainly provided with exhaust purification catalysts 26a and 26b having the function of purifying exhaust gas, such as, for example, a NOx catalyst, three-way catalyst, or oxidation catalyst. In the following description, the exhaust purification catalysts 26a and 26b are simply referred to as "the exhaust purification catalysts 26" when they are not distinguished.

In addition, the engine system 100 is provided with the sensors 30 to 40 that detect various states about the engine system 100. These sensors 30 to 40 will be specifically described below. The accelerator opening sensor 30 detects an accelerator opening that is the opening of an accelerator pedal, which corresponds to the amount of depression of the accelerator pedal by the driver. The air flow sensor 31 detects the amount of intake air, which corresponds to the flowrate of intake air passing through the intake passage 1. The throttle opening sensor 32 detects the throttle opening that is the opening of the throttle valve 5. The pressure sensor 33 detects the intake manifold pressure (pressure of an intake manifold), which corresponds to the pressure of intake air to be supplied to the engine 10. The crank angle sensor 34 functions as rotation speed detecting means and detects the crank angle of the crankshaft 16. The water temperature sensor 35 detects the water temperature that is the temperature of cooling water for cooling the engine 10. The temperature sensor 36 detects the in-cylinder temperature that is the temperature in the cylinder 2 of the engine 10. The cam angle sensors 37 and 38 detect operation timings including the closing timings of the intake valve 12 and the exhaust valve 17, respectively. The vehicle speed sensor 39 detects the speed (vehicle speed) of the vehicle. The steering angle sensor 40 detects the rotation angle of the steering wheel. The various sensors 30 to 40 output detection signals S130 to S140 corresponding to detected parameters to the PCM 50.

The PCM 50 controls the components in the engine system 100 based on the detection signals S130 to S140 input from the various sensors 30 to 40 described above. Specifically, as illustrated in FIG. 3, the PCM 50 controls the opening and closing timing and the throttle opening of the throttle valve 5 by supplying a control signal S105 to the throttle valve 5, controls the fuel injection amount and the fuel injection timing by supplying a control signal S113 to the fuel injection valve 13, controls the ignition timing by supplying a control signal S114 to the ignition plug 14, controls the operation timings of the intake valve 12 and the exhaust valve 17 by supplying control signals S118 and S119 to the variable intake valve mechanism 18 and the variable exhaust valve mechanism 19, respectively, and controls the stop and start of the opening and closing operation of the intake valves 12 and the exhaust valves 17 of the first cylinder 2A and the fourth cylinder 2D by supplying a control signal S120 to the valve stop mechanism 20. It should be noted here that the throttle valve 5, the fuel injection valve 13, the ignition plug 14, the variable intake valve mechanism 18, and the variable exhaust valve mechanism 19 correspond to examples of "the engine control mechanisms" in the present invention.

In particular, in the embodiment, upon satisfaction of the conditions (vehicle posture control start condition/execution condition) that the vehicle is traveling and a steering angle-related value (typically, the steering speed) related to the steering angle of the steering wheels increases, the PCM 50 executes vehicle posture control (in other words, torque reduction control) for controlling the posture of the vehicle by reducing the generated torque (engine torque) of the engine 10 to generate vehicle deceleration. In addition, the PCM 50 performs control that switches the operation mode of the engine 10 between the reduced-cylinder operation mode and the all-cylinder operation mode based on the operational state of the engine 10. In particular, in the embodiment, the PCM 50 permits or disallows the execution of vehicle posture control based on the engine rotation speed and permits or disallows the execution of the reduced-cylinder operation mode (in other words, permits or disallows switching from the all-cylinder operation mode to the reduced-cylinder operation mode).

The PCM 50 described above is formed by a computer including a CPU (Central Processing Unit), various programs (including a basic control program such as an OS and application programs started under the OS to achieve specific functions) to be interpreted and executed by the CPU, and internal memories such as a ROM and a RAM in which the programs and various types of data are stored. In addition, the PCM 50 is configured to function as "the control means" in the present invention.

Figure 4:
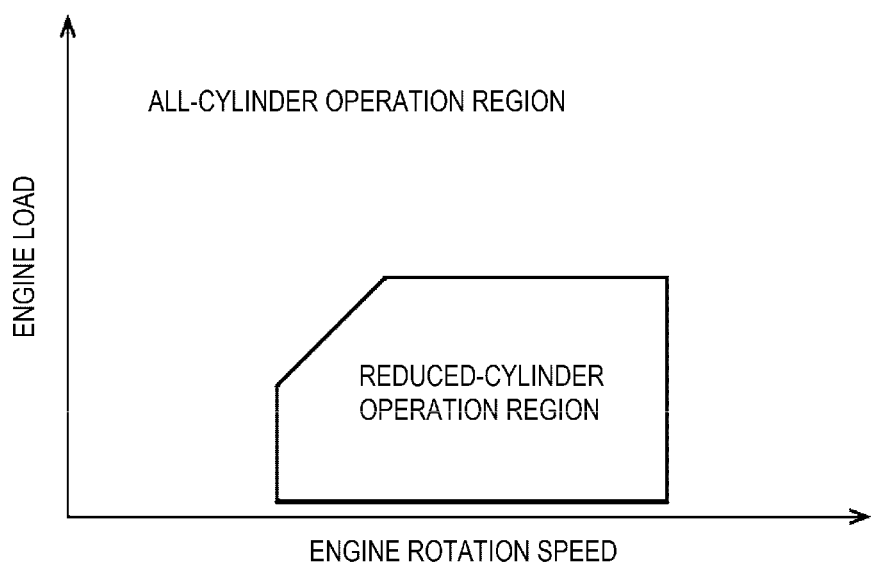
FIG. 4 is a map conceptually illustrating operation regions of the engine in which operation modes are switched to each other in the embodiment of the present invention.

Here, operation regions in which reduced-cylinder operation and all-cylinder operation are performed in the embodiment of the present invention will be described with reference to FIG. 4. FIG. 4 is a map conceptually illustrating the operation regions in which operation modes (the all-cylinder operation mode and the reduced-cylinder operation mode) are switched to each other in the embodiment of the present invention. In FIG. 4, the horizontal axis indicates the engine rotation speed and the vertical axis indicates the engine load.

As shown in FIG. 4, a reduced-cylinder operation region for reduced-cylinder operation is set in a range in which the engine rotational speed is relatively low and the engine load is relatively low, and an all-cylinder operation region for all-cylinder operation is set in the range excluding this reduced-cylinder operation region. The PCM 50 decides whether the current engine rotation speed and the engine load are included in the reduced-cylinder operation region or the all-cylinder operation region with reference to such a map and executes either reduced-cylinder operation or all-cylinder operation based on the decision result. In this case, the PCM 50 switches between reduced-cylinder operation and all-cylinder operation by controlling the stop or start of the opening and closing operation of the intake valves 12 and the exhaust valves 17 of the first cylinder 2A and the fourth cylinder 2D using the valve stop mechanism 20 and controlling the ignition of the ignition plugs 14 and the execution or non-execution of fuel injection of the fuel injection valves 13 of the first cylinder 2A and the fourth cylinder 2D.

<Control Performed in Embodiments>

Next, specific embodiments (first to fourth embodiments) of control to be performed by the PCM 50 in the present invention will be described.

First Embodiment

Figure 5:
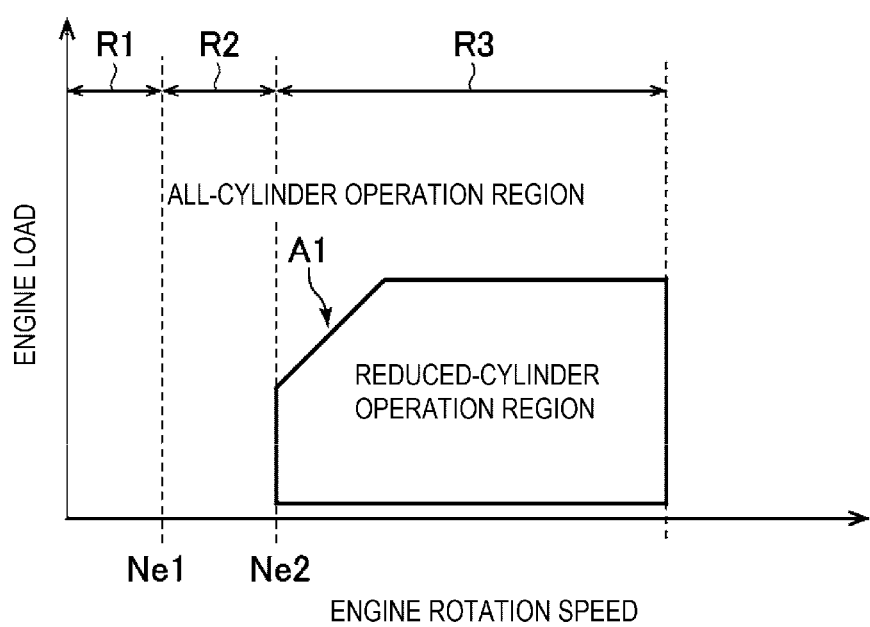
FIG. 5 is an explanatory diagram illustrating control in a first embodiment of the present invention.

First, the summary of control performed by the PCM 50 in the first embodiment of the present invention will be described with reference to FIG. 5. FIG. 5 is a map conceptually illustrating operation regions in which operation modes are switched to each other as in FIG. 4.

As illustrated in FIG. 5, in the first embodiment, the PCM 50 permits the execution of vehicle posture control when the engine rotation speed is more than or equal to a first rotation speed Ne1. In other words, the PCM 50 disallows the execution of vehicle posture control when the engine rotation speed is less than the first rotation speed Ne1. In addition, the PCM 50 permits the execution of reduced-cylinder operation of the engine 10 when the engine rotation speed is more than or equal to a second rotation speed Ne2 that is more than the first rotation speed Ne1. In other words, the PCM 50 disallows the execution of reduced-cylinder operation of the engine 10 when the engine rotation speed is less than the second rotation speed Ne2. In principle, engine rotation speeds within the low rotation speed region are applied to the first rotation speed Ne1 and the second rotation speed Ne2 described above.

Specifically, the PCM 50 functions so as to disallow vehicle posture control and reduced-cylinder operation in the rotation speed region indicated by symbol R1 in which the engine rotation speed is less than the first rotation speed Ne1, permit only vehicle posture control and disallow reduced-cylinder operation in the rotation speed region indicated by symbol R2 in which the engine rotation speed is more than or equal to the first rotation speed Ne1 and less than the second rotation speed Ne2, and permit both vehicle posture control and reduced-cylinder operation in the rotation speed region indicated by symbol R3 in which the engine rotation speed is more than or equal to the second rotation speed Ne2.

It should be noted here that the PCM 50 disallows reduced-cylinder operation when the engine rotation speed is more than or equal to a predetermined rotation speed that is more than the second rotation speed Ne2.

As described above, when the engine rotation speed increases from a state less than the first rotation speed Ne1, if the engine rotation speed is more than or equal to the first rotation speed Ne1, the PCM 50 permits the execution of vehicle posture control. After that, when the engine rotation speed is more than or equal to the second rotation speed Ne2, the PCM 50 permits the execution of reduced-cylinder operation of the engine 10. This suppresses the execution of reduced-cylinder operation during vehicle posture control particularly when the engine rotation speed is more than or equal to the first rotation speed Ne1 and less than the second rotation speed Ne2 in the low rotation speed region of the engine 10 (rotation speed region R2).

Preferably, the first rotation speed Ne1 is set to approximately one-seventh of the engine upper limit rotation speed and the second rotation speed Ne2 is set to approximately one-sixth of the engine upper limit rotation speed. In one example, for a gasoline engine, the engine upper limit rotation speed is approximately 6000 to 6500 (rpm). In this case, the first rotation speed Ne1 is set to approximately 900 (rpm) and the second rotation speed Ne2 is set to approximately 1100 (rpm). In another example, for a diesel engine, the engine upper limit rotation speed is approximately 5000 to 5500 (rpm). In this case, the first rotation speed Ne1 is set to approximately 750 (rpm) and the second rotation speed Ne2 is set to approximately 900 (rpm).

It should be noted here that, as illustrated in arrow A1 in FIG. 5, the second rotation speed Ne2 at which reduced-cylinder operation is permitted may be changed according to the engine load (that uniquely corresponds to the accelerator opening). Specifically, the second rotation speed Ne2 is preferably higher as the engine load becomes larger.

Figure 6:
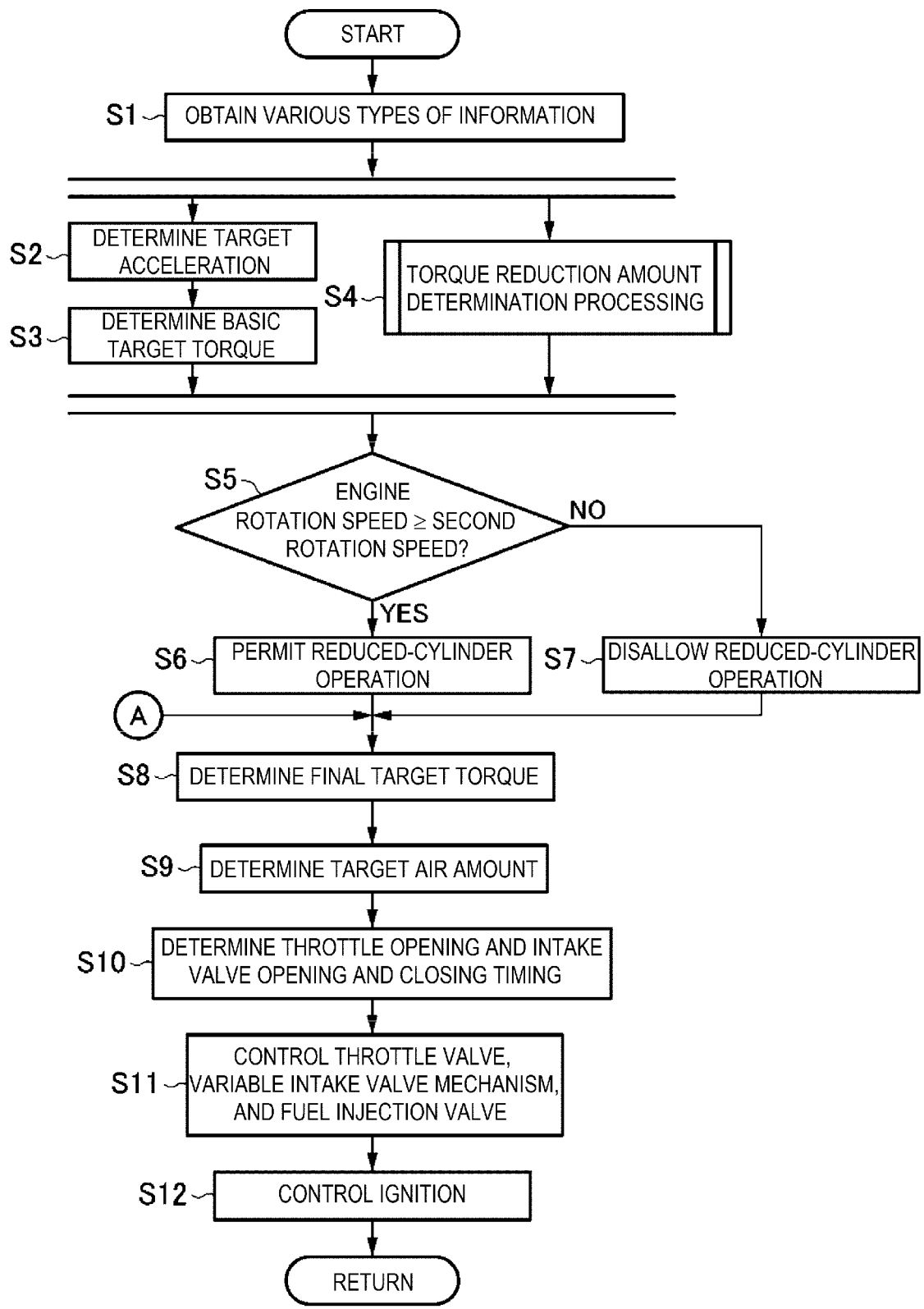
FIG. 6 is a flowchart illustrating engine control processing in the first embodiment of the present invention.
Figure 7:
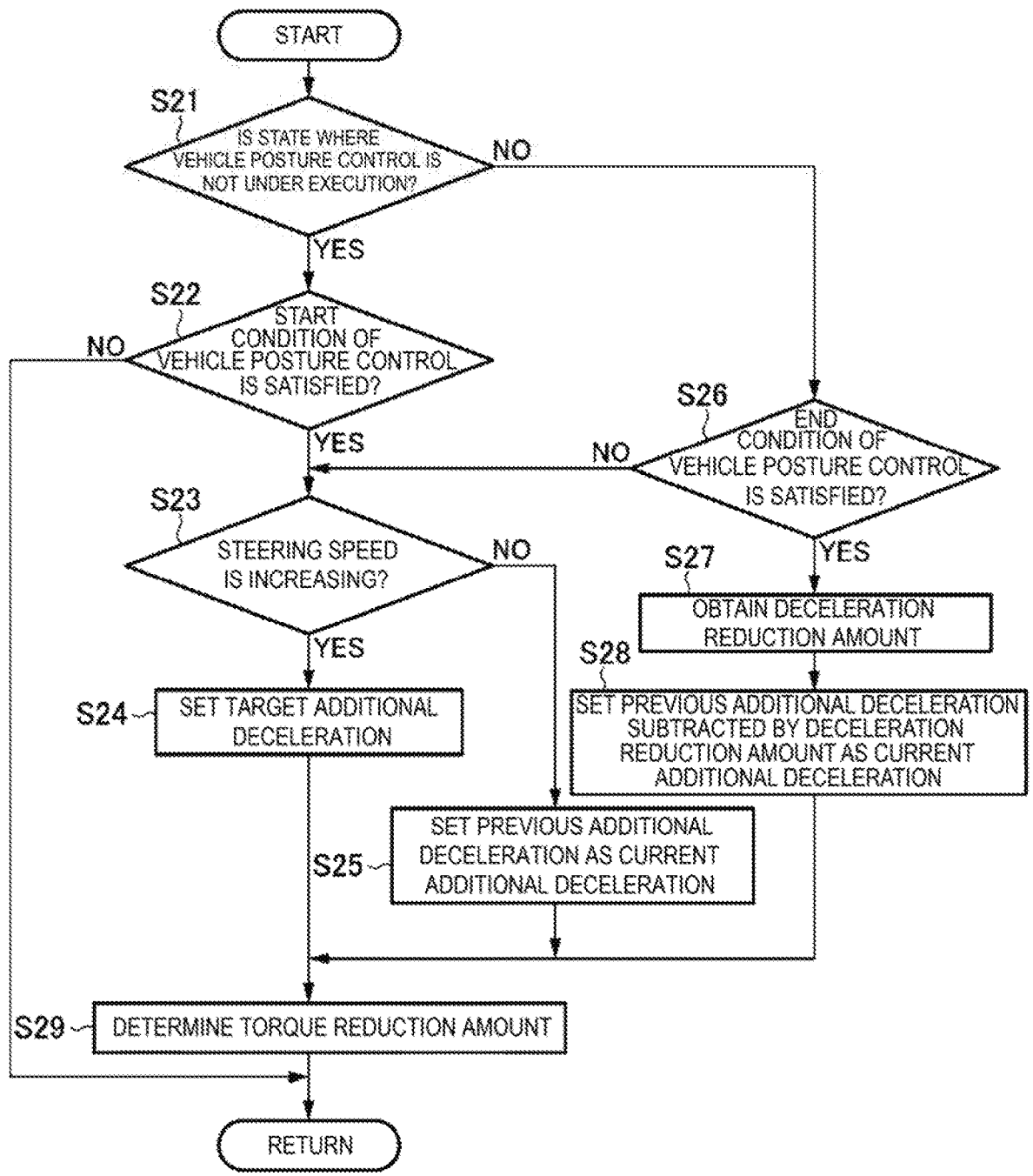
FIG. 7 is a flowchart illustrating torque reduction amount determination processing in the first embodiment of the present invention.
Figure 8:
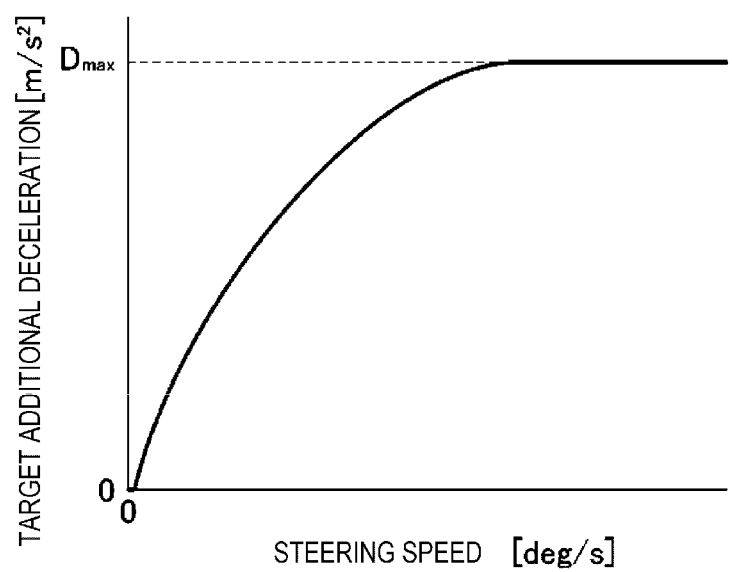
FIG. 8 is a map illustrating the relationship between a target additional deceleration and steering speed in the first embodiment of the present invention.

Next, the control performed by the PCM 50 in the first embodiment of the present invention will be specifically described with reference to FIG. 6 to FIG. 8. FIG. 6 is a flowchart illustrating engine control processing in the first embodiment of the present invention. FIG. 7 is a flowchart illustrating torque reduction amount determination processing in the first embodiment of the present invention. FIG. 8 is a map illustrating the relationship between target additional deceleration and steering speed in the first embodiment of the present invention.

The engine control processing in FIG. 6 is started when ignition of the vehicle is turned on and the power to the control device of the engine is turned on and the engine control processing is performed repeatedly. In addition, this engine control processing is executed while the vehicle travels. In particular, the engine control processing is started basically in the state in which the engine 10 performs all-cylinder operation.

When the engine control processing has been started, the PCM 50 obtains the operational state of the vehicle in step S1 as illustrated in FIG. 6. Specifically, the PCM 50 obtains, as the operational state, the detection signals S130 to S140 output by the various sensors 30 to 40 including the engine rotation speed corresponding to the crank angle detected by the crank angle sensor 34, the accelerator opening detected by the accelerator opening sensor 30, the vehicle speed detected by the vehicle speed sensor 39, the steering angle detected by the steering angle sensor 40, the gear stage currently set in the automatic transmission of the vehicle, and the like.

Next, in step S2, the PCM 50 sets the target acceleration based on the operational state of the vehicle including the operation of the accelerator pedal obtained in step S1. Specifically, the PCM 50 selects an acceleration characteristic map corresponding to the current vehicle speed and gear stage from acceleration characteristic maps (created in advance and stored in a memory or the like) defined for various vehicle speeds and various gear stages and determines the target acceleration corresponding to the current accelerator opening with reference to the selected acceleration characteristic map. Next, in step S3, the PCM 50 determines the basic target torque of the engine 10 that achieves the target acceleration determined in step S2. In this case, the PCM 50 determines the basic target torque within the range of the torque that can be output by the engine 10, based on the current vehicle speed, the gear stage, the road surface gradient, the road surface t, and the like.

In addition, concurrently with the processes in steps S2 and S3, the processing of step S4 is performed. In step S4, the PCM 50 executes torque reduction amount determination processing that determines the torque reduction amount in the vehicle posture control described above based on the steering angle of the steering wheels detected by the steering angle sensor 40. The torque reduction amount determination processing will be described in detail later.

Next, in step S5, the PCM 50 decides whether the engine rotation speed obtained in step S1 is more than or equal to the second rotation speed Ne2. As a result of the decision, when the engine rotation speed is more than or equal to the second rotation speed Ne2 (Yes in step S5), the PCM 50 proceeds to step S6 and permits the engine 10 to execute reduced-cylinder operation. That is, the PCM 50 permits the operation mode of the engine 10 to switch from the all-cylinder operation mode to the reduced-cylinder operation mode. In this case, when all other conditions (such as, for example, the engine load) for switching from the all-cylinder operation mode to the reduced-cylinder operation mode are satisfied, the PCM 50 executes control for actually switching the operation mode to the reduced-cylinder operation mode.

In contrast, when the engine rotation speed is less than the second rotation speed Ne2 (No in step S5), the PCM 50 proceeds to step S7 and disallows the engine 10 to execute the reduced-cylinder operation. That is, the PCM 50 prohibits the switching of the operation mode of the engine 10 from the all-cylinder operation mode to the reduced-cylinder operation mode. This suppresses the execution of reduced-cylinder operation in the low rotation speed region of the engine 10.

Next, in step S8, the PCM 50 determines the final target torque based on the basic target torque determined in step S3 and the torque reduction amount determined in the torque reduction amount determination processing in step S4. Specifically, when the torque reduction amount is determined in the torque reduction amount determination processing (corresponding to the case in which vehicle posture control is executed), the PCM 50 determines the final target torque by subtracting the torque reduction amount from the basic target torque. In contrast, when the torque reduction amount is not determined in the torque reduction amount determination processing (corresponding to the case in which vehicle posture control is not executed), the PCM 50 determines the basic target torque as the final target torque.

Next, the PCM 50 proceeds to step S9 and determines the target air amount and the target fuel amount that cause the engine 10 to output the final target torque determined in step S8. Here, the "air amount" is the amount of air introduced to the combustion chamber 11 of the engine 10. The filling efficiency that is the dimensionless quantity of this air amount may be used. Specifically, the PCM 50 calculates the target indicated torque obtained by adding the loss torque due to friction loss and pumping loss to the final target torque, calculates the target fuel amount required to generate this target indicated torque, and determines the target air amount based on the target fuel amount and the target equivalence ratio.

Next, in step S10, the PCM 50 determines the opening of the throttle valve 5 and the opening and closing timing of the intake valve 12 via the variable intake valve mechanism 18 in consideration of the air amount detected by the air flow sensor 31 so that the air of the target air amount determined in step S9 is introduced into the engine 10.

Next, in step S11, the PCM 50 controls the throttle valve 5 and the variable intake valve mechanism 18 based on the throttle opening and the opening and closing timing of the intake valve 12 set in step S10 and controls the fuel injection valve 13 based on the target fuel amount calculated in step S9.

Next, in step S12, the PCM 50 sets the ignition timing so as to cause the engine 10 to output the final target torque based on the final target torque determined in step S8 and the actual air amount introduced to the combustion chamber 11 by controlling the throttle valve 5 and the variable intake valve mechanism 18 in step S10, and controls the ignition plug 14 so that ignition occurs at this ignition timing. After step S12, the PCM 50 ends the engine control processing.

Next, the torque reduction amount determination processing illustrated in FIG. 7 will be described. This torque reduction amount determination processing is performed in step S4 in FIG. 6.

After the torque reduction amount determination processing is started, the PCM 50 decides in step S21 whether vehicle posture control is currently under execution. As a result of the decision, when it is a state in which vehicle posture control is not under execution (Yes in step S21), the PCM 50 proceeds to step S22 and decides whether the vehicle posture control start condition is satisfied. Specifically, the PCM 50 decides whether the change speed (the steering speed is preferably calculated based on the steering angle obtained in step S1) of the steering angle is more than or equal to a predetermined start threshold and the engine rotation speed is more than or equal to the first speed Ne1. As a result of the decision, when the change speed of the steering angle is more than or equal to the start threshold and the engine rotation speed is more than or equal to the first speed Ne1, that is, when the vehicle posture control start condition is satisfied (Yes in step S22), the PCM 50 proceeds to step S23. In contrast, when the change speed of the steering angle is less than the start threshold or when the engine rotation speed is less than the first rotation speed Ne1, that is, when the vehicle posture control start condition is not satisfied (No in step S22), the processing ends.

Next, in step S23, the PCM 50 decides whether the steering speed (change speed of the steering angle) is increasing. As a result of the decision, when the steering speed is increasing (Yes in step S23), the PCM 50 proceeds to step S24 and sets the target additional deceleration based on the steering speed. This target additional deceleration is the deceleration that is added to the vehicle according to the steering operation in order to accurately achieve the vehicle behavior intended by the driver.

Basically, the PCM 50 obtains the target additional deceleration corresponding to the current steering speed based on the relationship between the target additional deceleration and the steering speed illustrated in the map of FIG. 8. In FIG. 8, the horizontal axis indicates the steering speed and the vertical axis indicates the target additional deceleration. As illustrated in FIG. 8, as the steering speed is higher, the target additional deceleration corresponding to this steering speed asymptotically becomes closer to a predetermined upper limit (for example, 1 m/s$^2$). Specifically, as the steering speed is higher, the target additional deceleration becomes larger and the increase ratio of the increase amount becomes smaller.

In contrast, as a result of the decision in step S23, when the steering speed is not increasing (No in step S23), that is, when the steering speed reduces or does not change, the PCM 50 proceeds to step S25. In step S25, the PCM 50 determines the additional deceleration determined in the previous processing as the additional deceleration in the current processing.

In contrast, as a result of the decision in step S21, when vehicle posture control is under execution (No in step S21), the PCM 50 proceeds to step S26. In step S26, the PCM 50 decides whether the vehicle posture control end condition is satisfied. Specifically, the PCM 50 decides whether the change speed of the steering angle is less than a predetermined end threshold or the engine rotation speed is less than the first rotation speed Ne1. As a result of the decision, when the change speed of the steering angle is more than or equal to the end threshold and the engine rotation speed is more than or equal to the first rotation speed Ne1, that is, when the vehicle posture control end condition is not satisfied (No in step S26), the PCM 50 proceeds to step S23. In this case, the PCM 50 executes the processing of step S23 and subsequent steps described above to continue the vehicle posture control.

In contrast, when the change speed of the steering angle is less than the end threshold or when the engine rotation speed is less than the first rotation speed Ne1, that is, when the vehicle posture control end condition is satisfied (Yes in step S26), the PCM 50 proceeds to step S27. In step S27, the PCM 50 obtains the amount (deceleration reduction amount) by which the additional deceleration determined in the previous processing is reduced from the current processing. In one example, the PCM 50 calculates the deceleration reduction amount based on the reduction rate according to the steering speed using a map as illustrated in FIG. 8 as in the target additional deceleration. In another example, the PCM 50 calculates the deceleration reduction amount based on a certain reduction rate (for example, 0.3 m/s$^3$) stored in advance in a memory or the like.

Next, in step S28, the PCM 50 determines the additional deceleration in the current processing by subtracting the deceleration reduction amount obtained in step S27 from the additional deceleration determined in the previous processing.

After step S24. S25, or S28, in step S29, the PCM 50 determines the torque reduction amount based on the current additional deceleration determined in step S24. S25, or S28. Specifically, the PCM 50 determines the torque reduction amount required to achieve the current additional deceleration based on the current vehicle speed, the gear stage, the road surface gradient, and the like acquired in step S1. After step S29, the PCM 50 ends the torque reduction amount determination processing and returns to the main routine.

When the target additional deceleration is determined in step S24 in FIG. 7, the additional deceleration in the current processing is preferably determined in the range in which the increase rate of the additional deceleration is less than or equal to a predetermined threshold (for example, 0.5 m/s$^3$). Specifically, when the increase rate from the additional deceleration determined in the previous processing to the target additional deceleration determined in step S24 of the current processing is less than or equal to the threshold, the PCM 50 determines the target additional deceleration determined in step S24 as the additional deceleration in the current processing. In contrast, when the change rate from the additional deceleration determined in the previous processing to the target additional deceleration determined in step S24 of the current processing is more than the threshold, the PCM 50 determines the value increased by the threshold from the additional deceleration determined in the previous processing until this processing time, as the additional deceleration in the current processing.

According to the first embodiment described above, the PCM 50 permits the execution of vehicle posture control when the engine rotation speed is more than or equal to the first rotation speed Ne1 and permits the execution of reduced-cylinder operation when the engine rotation speed is more than or equal to the second rotation speed Ne2 (>the first rotation speed Ne1). This can appropriately limit the execution of reduced-cylinder operation in the low rotation speed region (the execution of the vehicle posture control is permitted in this region) in which the engine rotation speed is more than or equal to the first rotation speed Ne1 and less than the second rotation speed Ne2. As a result, the degradation of the response of vehicle posture control can be appropriately suppressed by executing reduced-cylinder operation during vehicle posture control in the low rotation speed region. That is, the response of vehicle posture control in the low rotation speed region can be ensured.

Second Embodiment

Next, control in the second embodiment of the present invention will be described. The second embodiment is different from the first embodiment in that, when the state in which the engine rotation speed is more than or equal to the first rotation speed Ne1 and less than the second rotation speed Ne2 and vehicle posture control is under execution is changed to the state in which the engine rotation speed is more than or equal to the second rotation speed Ne2, the PCM 50 limits the permission of reduced-cylinder operation until the execution of vehicle posture control ends. That is, in the second embodiment, even when the engine rotation speed changes from a value less than the second rotation speed Ne2 to a value more than or equal to the second rotation speed Ne2, the PCM 50 prioritizes the vehicle posture control while the vehicle posture control is under execution at the time of this change and does not execute reduced-cylinder operation until the vehicle posture control ends.

It should be noted here that the control and processing that are different from those of the first embodiment will be mainly described below and the control and processing that are the same as those of the first embodiment are not described below as appropriate. That is, the control and processing not described here are the same as those of the first embodiment. This is true of the working effect.

Figure 9:
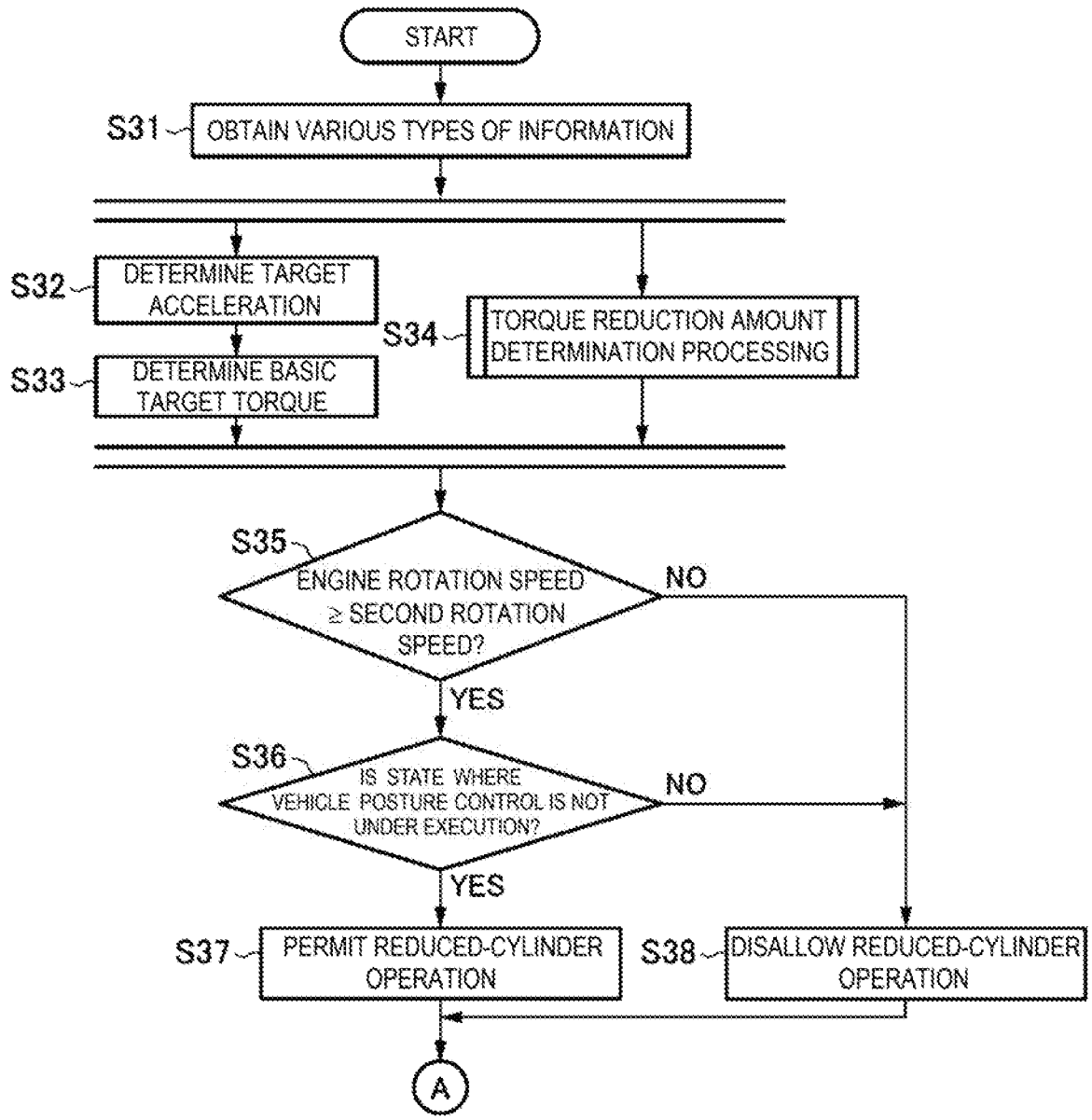
FIG. 9 is a flowchart illustrating engine control processing in a second embodiment of the present invention.

FIG. 9 is a flowchart illustrating engine control processing in the second embodiment of the present invention. The engine control processing in FIG. 9 is started when ignition of the vehicle is turned on and the power to the control device of the engine is turned on and the engine control processing is performed repeatedly. In addition, this engine control processing is executed while the vehicle travels. In particular, the engine control processing is basically started in the state in which the engine 10 performs all-cylinder operation.

Since the processing of steps S31 to S34 is the same as the processing of steps S1 to S4 in FIG. 6, respectively, the description thereof is omitted here and only the processing of step S35 and subsequent steps will be described. First, in step S35, the PCM 50 decides whether the engine rotation speed obtained in step S31 is more than or equal to the second rotation speed Ne2. As a result of the decision, when the engine rotation speed is more than or equal to the second rotation speed Ne2 (Yes in step S35), the PCM 50 proceeds to step S36. In contrast, when the engine rotation speed is less than the second rotation speed Ne2 (No in step S35), the PCM 50 proceeds to step S38 and disallows the engine 10 to execute reduced-cylinder operation.

Next, in step S36, the PCM 50 decides whether vehicle posture control is currently under execution. As a result of the decision, when it is a state in which vehicle posture control is not under execution (Yes in step S36), the PCM 50 proceeds to step S37 and permits the engine 10 to execute reduced-cylinder operation. In this case, when all other conditions (such as, for example, the engine load) for switching from the all-cylinder operation mode to the reduced-cylinder operation mode are satisfied, the PCM 50 performs the control for actually switching the operation mode to the reduced-cylinder operation mode. In contrast, when vehicle posture control is under execution (No in step S36), the PCM 50 proceeds to step S38 and disallows the engine 10 to execute reduced-cylinder operation. This suppresses the execution of reduced-cylinder operation during vehicle posture control even when the engine rotation speed is more than or equal to the second rotation speed Ne2.

After step S37 and step S38 described above, the PCM 50 proceeds to step S8 in FIG. 6 and performs the processing of steps S8 to S12 as in the first embodiment.

According to the second embodiment described above, when the engine rotation speed changes from a value less than the second rotation speed Ne2 to a value more than or equal to the second rotation speed Ne2 during the vehicle posture control, the PCM 50 limits the permission of the execution of the reduced-cylinder operation until the execution of the vehicle posture control ends. Therefore, if the vehicle posture control is under execution even when the engine rotation speed is more than or equal to the second rotation speed Ne2, the execution of the reduced-cylinder operation during the vehicle posture control can be appropriately limited and the degradation of the response of the vehicle posture control can be suppressed effectively. In particular, although the engine 10 is controlled to restore the engine torque to the torque before the execution of the vehicle posture control when ending the vehicle posture control, the present invention described above can appropriately suppress the degradation of the response of torque restoration by executing the reduced-cylinder operation at this time.

Third Embodiment

Next, control in the third embodiment of the present invention will be described. The third embodiment is different from the first and second embodiments in that, when the state in which the engine rotation speed is more than or equal to the second rotation speed Ne2 and vehicle posture control and reduced-cylinder operation are under execution is changed to the state in which the engine rotation speed is less than the second rotation speed Ne2, the PCM 50 limits the transition from reduced-cylinder operation to all-cylinder operation until the execution of vehicle posture control ends. That is, in the third embodiment, even when the engine rotation speed changes from a value more than or equal to the second rotation speed Ne2 to a value less than the second rotation speed Ne2, the PCM 50 prioritizes the vehicle posture control when the vehicle posture control is under execution during the change and does not perform transition from reduced-cylinder operation to all-cylinder operation until the vehicle posture control ends. This suppresses occurrence of a torque shock (torque change) because of duplication of engine control for torque restoration at the end of the vehicle posture control and engine control for switching from reduced-cylinder operation to all-cylinder operation.

It should be noted here that the control and processing that are different from those of the first and second embodiments will be mainly described below and the control and processing that are the same as those of the first and second embodiments are not described below as appropriate. That is, the control and processing not described here are the same as those of the first and second embodiments. This is true of the working effect.

Figure 10:
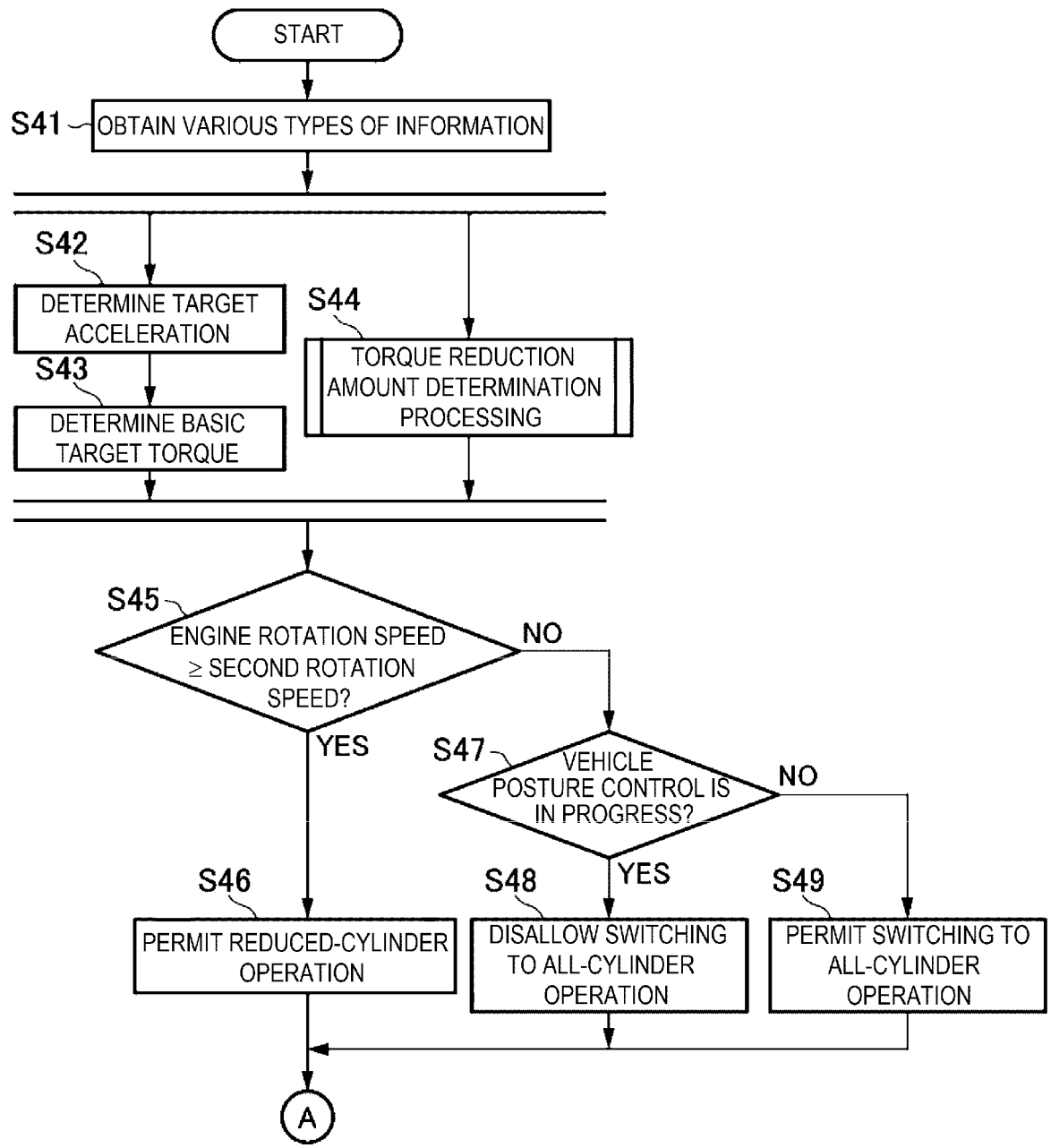
FIG. 10 is a flowchart illustrating engine control processing in a third embodiment of the present invention.

FIG. 10 is a flowchart illustrating engine control processing in the third embodiment of the present invention. The engine control processing in FIG. 10 is started when ignition of the vehicle is turned on and the power to the control device of the engine is turned on and the engine control processing is performed repeatedly. In addition, this engine control processing is executed while the vehicle travels. In particular, the engine control processing is basically started in the state in which the engine rotation speed is more than or equal to the second rotation speed Ne2 and the engine 10 performs reduced-cylinder operation.

Since the processing of steps S41 to S44 is the same as the processing of steps S1 to S4 in FIG. 6, respectively, the description thereof is omitted here and only the processing of step S45 and subsequent steps will be described. First, in step S45, the PCM 50 decides whether the engine rotation speed obtained in step S41 is more than or equal to the second rotation speed Ne2. As a result of the decision, when the engine rotation speed is more than or equal to the second rotation speed Ne2 (Yes in step S45), the PCM 50 proceeds to step S46 and permits the engine 10 to execute reduced-cylinder operation. In this case, since the engine rotation speed is maintained at the second rotation speed Ne2 or more, the PCM 50 continues to permit reduced-cylinder operation.

In contrast, when the engine rotation speed is less than the second rotation speed Ne2 (No in step S45), that is, when the engine rotation speed changes from a value more than or equal to the second rotation speed Ne2 to a value less than the second rotation speed Ne2, the PCM 50 proceeds to step S47. In step S47, the PCM 50 decides whether vehicle posture control is currently under execution.

As a result of the decision in step S47, when vehicle posture control is not under execution (No in step S47), the PCM 50 proceeds to step S49 and permits the switching of the operation mode of the engine 10 from the reduced-cylinder operation mode to the all-cylinder operation mode according to the engine rotation speed less than the second rotation speed Ne2. In contrast, when vehicle posture control is under execution (Yes in step S47), the PCM 50 proceeds to step S48 and disallows the switching of the operation mode of the engine 10 from the reduced-cylinder operation mode to the all-cylinder operation mode. This suppresses the switching from reduced-cylinder operation to all-cylinder operation during vehicle posture control.

After step S46, step S48, and step S49 described above, the PCM 50 proceeds to step S8 in FIG. 6 and performs the processing of steps S8 to S12 as in the first embodiment.

According the third embodiment described above, even when the engine rotation speed changes from a value more than or equal to the second rotation speed Ne2 to a value less than the second rotation speed Ne2, if the vehicle posture control is under execution at the time of this change, the PCM 50 limits transition from the reduced-cylinder operation to the all-cylinder operation until the execution of the vehicle posture control ends. Therefore, occurrence of a torque shock can be appropriately suppressed by executing engine control for switching from reduced-cylinder operation to all-cylinder operation when engine control for torque restoration is performed at the end of the vehicle posture control.

It should be noted here that the third embodiment may be achieved in combination with the second embodiment. That is, also in the third embodiment, when the state in which the engine rotation speed is more than or equal to the first rotation speed Ne1 and less than the second rotation speed Ne2 and vehicle posture control is under execution is changed to the state in which the engine rotation speed is more than or equal to the second rotation speed Ne2, the PCM 50 may limit the permission of the execution of reduced-cylinder operation until the execution of the vehicle posture control ends.

Fourth Embodiment

Next, control in a fourth embodiment of the present invention will be described. In the first to third embodiments described above, only two modes that are the reduced-cylinder operation mode and the all-cylinder operation mode are used as the operation modes of the engine 10. That is, in the first to third embodiments, only one reduced-cylinder operation mode in which two of the cylinders 2A to 2D are stopped and the remaining two are operated is applied to the engine 10. On the other hand, in the fourth embodiment, two reduced-cylinder operation modes are defined and three operation modes including these two reduced-cylinder operation modes and the all-cylinder operation mode are used. Specifically, in the fourth embodiment, a reduced-cylinder operation mode (referred to below as a first reduced-cylinder operation mode as appropriate) in which only one of the cylinders 2A to 2D is stopped and the remaining three are operated is applied to the engine 10 in addition to the reduced-cylinder operation mode (referred to below as a second reduced-cylinder operation mode as appropriate) as in the first to third embodiments in which two of the cylinders 2A to 2D are stopped and the remaining two are operated.

It should be noted here that the control and processing that are different from those of the first to third embodiments will be mainly described below and the control and processing that are the same as those of the first to third embodiments are not described below as appropriate. That is, the control and processing not described here are the same as those of the first to third embodiments. This is true of the working effect.

Figure 11:
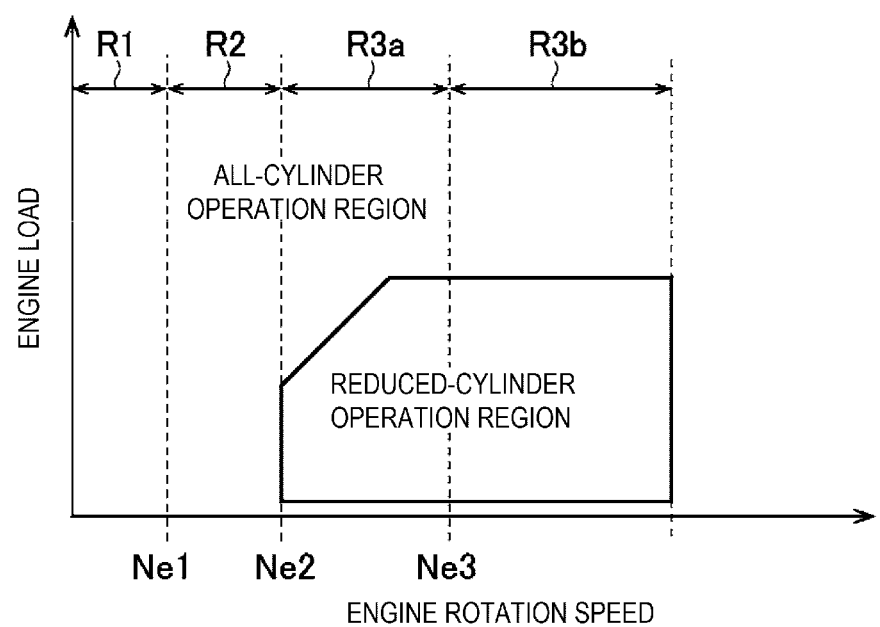
FIG. 11 is a map conceptually illustrating operation regions of an engine in which operation modes are switched to each other in a fourth embodiment of the present invention.

A map of operation regions applied in the fourth embodiment will be described with reference to FIG. 11. FIG. 11 is the map conceptually illustrating the operation regions in which operation modes are switched to each other in the fourth embodiment of the present invention. In FIG. 11, the horizontal axis indicates the engine rotation speed and the vertical axis indicates the engine load.

The map illustrated in FIG. 11 also defines the reduced-cylinder operation region and the all-cylinder operation region and has the same basic structure as the maps illustrated in FIGS. 4 and 5. That is, the PCM 50 permits the execution of vehicle posture control when the engine rotation speed is more than or equal to the first rotation speed Ne1 and permits the execution of reduced-cylinder operation of the engine 10 when the engine rotation speed is more than or equal to the second rotation speed Ne2 more than the first rotation speed Ne1. However, in the fourth embodiment, the PCM 50 permits the first reduced-cylinder operation mode in which only one of the cylinders 2A to 2D is stopped and the remaining three are operated when the engine rotation speed is more than or equal to the second rotation speed Ne2 and less than the third rotation speed Ne3 more than the second rotation speed Ne2 (the region indicated by reference numeral R3*a*) and permits the second reduced-cylinder operation mode in which two of the cylinders 2A to 2D are stopped and the remaining two are operated when the engine rotation speed is more than or equal to the third rotation speed (the region indicated by reference numeral R3*b*). That is, when executing the reduced-cylinder operation, the PCM 50 makes the number of cylinders in which combustion is stopped larger as the engine rotation speed becomes higher.

As a rule, engine rotation speeds in the low rotation speed region are applied to the first rotation speed Ne1, the second rotation speed Ne2, and the third rotation speed Ne3 described above. The same rotation speed as in the first embodiment is applied to the first rotation speed Ne1. On the other hand, a rotation speed different from that of the first embodiment is preferably applied to the second rotation speed Ne2. A rotation speed lower than that of the first embodiment is preferably applied to the second rotation speed Ne2. In one example, for a gasoline engine having an upper limit rotation speed of the engine of approximately 6000 to 6500 (rpm), the first rotation speed Ne1 is set to approximately 900 (rpm), the second rotation speed Ne2 is set to approximately 1000 (rpm), and the third rotation speed Ne2 is set to approximately 1100 (rpm).

Figure 12:
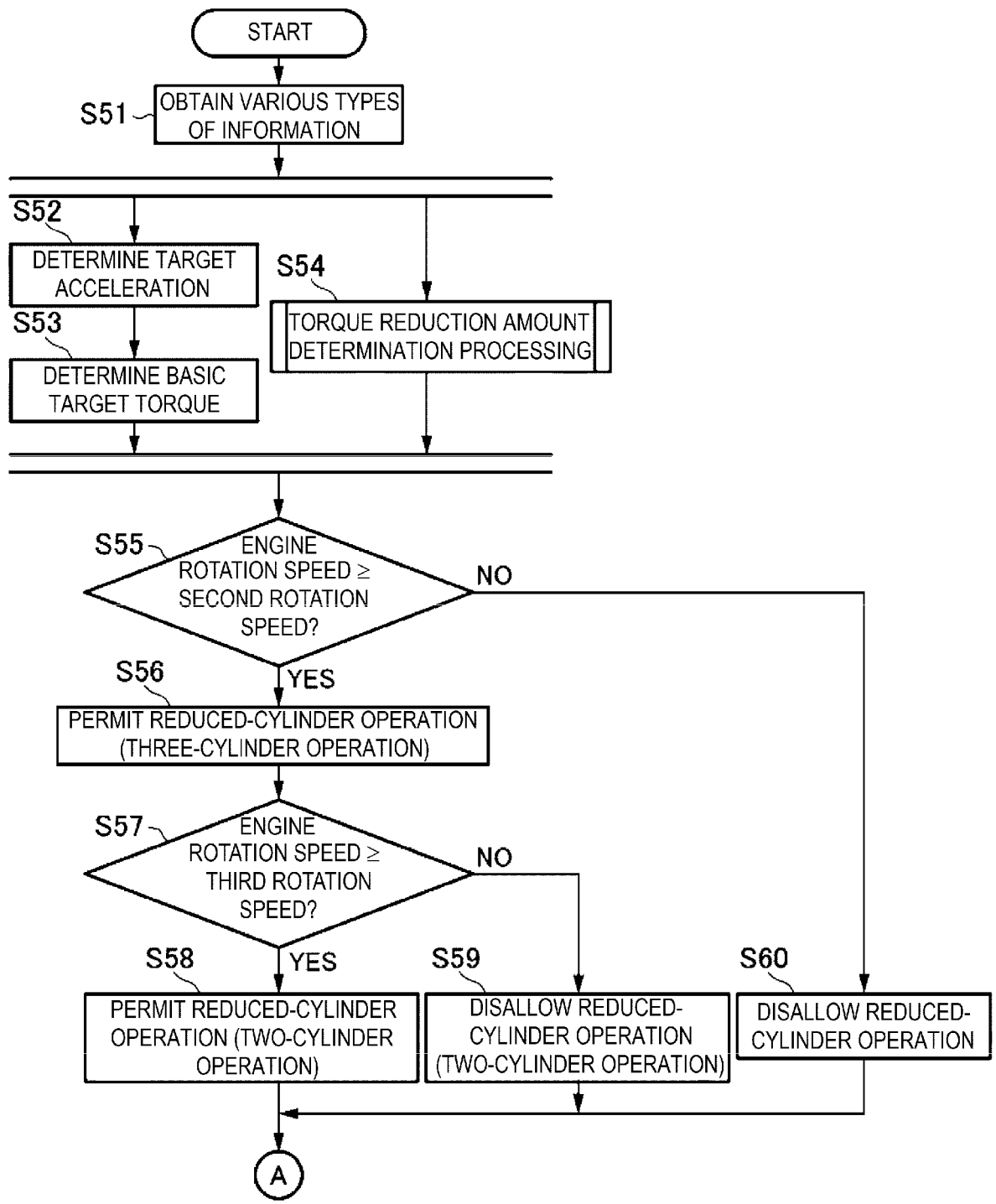
FIG. 12 is a flowchart illustrating engine control processing in the fourth embodiment of the present invention.

FIG. 12 is a flowchart illustrating engine control processing in the fourth embodiment of the present invention. The engine control processing in FIG. 12 is started when the ignition of the vehicle is turned on and the power to the control device of the engine is turned on and the engine control processing is performed repeatedly. In addition, this engine control processing is executed while the vehicle travels. In particular, the engine control processing is basically started in the state in which the engine 10 performs all-cylinder operation.

Since the processing of steps S51 to S54 is the same as the processing of steps S to S4 in FIG. 6, respectively, the description thereof is omitted here and only the processing of step S55 and subsequent steps will be described. First, in step S55, the PCM 50 decides whether the engine rotation speed obtained in step S51 is more than or equal to the second rotation speed Ne2. As a result of the decision, when the engine rotation speed is more than or equal to the second rotation speed Ne2 (Yes in step S55), the PCM 50 proceeds to step S56 and permits the engine 10 to execute the first reduced-cylinder operation mode in which only one of the cylinders 2A to 2D is stopped and the remaining three are operated. That is, the PCM 50 permits the engine 10 to execute three-cylinder operation. In contrast, when the engine rotation speed is less than the second rotation speed Ne2 (No in step S55), the PCM 50 proceeds to step S60 and disallows the engine 10 to execute reduced-cylinder operation. That is, the PCM 50 prohibits the switching of the operation mode of the engine 10 from the all-cylinder operation mode to the reduced-cylinder operation mode (specifically, the first reduced-cylinder operation mode).

After step S56, the PCM 50 proceeds to step S57 and decides whether the engine rotation speed is more than or equal to the third rotation speed Ne3. As a result of the decision, when the engine rotation speed is more than or equal to the third rotation speed Ne3 (Yes in step S57), the PCM 50 proceeds to step S58 and permits the engine 10 to execute the second reduced-cylinder operation mode in which two of the cylinders 2A to 2D are stopped and the remaining two are operated. That is, the PCM 50 permits the engine 10 to execute two-cylinder operation. In contrast, when the engine rotation speed is less than the third rotation speed Ne3 (No in step S57), the PCM 50 proceeds to step S59 and disallows the engine 10 to execute the second reduced-cylinder operation mode (two-cylinder operation). That is, the PCM 50 prohibits the switching of the operation mode of the engine 10 from the first reduced-cylinder operation mode to the second reduced-cylinder operation mode.

After step S58, step S59, and step S60 described above, the PCM 50 proceeds to step S8 in FIG. 6 and performs the processing of steps S8 to S12 as in the first embodiment.

According to the fourth embodiment described above, when the engine rotation speed is more than or equal to the third rotation speed Ne3 that is more than the second rotation speed Ne2, the PCM 50 permits the number of the cylinders in which combustion is stopped in reduced-cylinder operation to become larger than when the rotation speed is more than or equal to the second rotation speed Ne2 and less than the third rotation speed Ne3. This can appropriately increase the number of stopped cylinders according to the engine rotation speed and can improve the reduction effect of pumping loss due to reduced-cylinder operation. As a result, the fuel consumption can be improved effectively.

Although an example in which the fourth embodiment is applied to the engine 10 (four-cylinder engine) that executes two reduced-cylinder operation modes is described above, the fourth embodiment is applicable to the engine 10 (such as, for example, a six-cylinder engine and an eight-cylinder engine) that executes three or more reduced-cylinder operation modes. Also in this case, the number of cylinders in which combustion is stopped in reduced-cylinder operation only is preferably larger as the engine rotation speed becomes higher.

It should be noted here that the fourth embodiment may be achieved in combination with the second and third embodiments. That is, also in the fourth embodiment, when the state in which the engine rotation speed is more than or equal to the first rotation speed Ne1 and less than the second rotation speed Ne2 and vehicle posture control is under execution is changed to the state in which the engine rotation speed is more than or equal to the second rotation speed Ne2, the PCM 50 may limit the permission of the execution of reduced-cylinder operation until the execution of the vehicle posture control ends. In addition, when the state in which the engine rotation speed is more than or equal to the second rotation speed Ne2 and vehicle posture control and reduced-cylinder operation are under execution is changed to the state in which the engine rotation speed is less than the second rotation speed Ne2, the PCM 50 may limit the transition from the reduced-cylinder operation to the all-cylinder operation until the execution of the vehicle posture control ends.

<Modifications>

In the embodiments described above, the execution of the vehicle posture control is permitted or disallowed and the execution of the reduced-cylinder operation mode is permitted or disallowed based on the engine rotation speed. In other examples, such permission or disallowance may be performed by obtaining parameters corresponding to the engine rotation speed based on state values such as the crank angle, the cam angle, the number of ignitions, the transmission input speed, the number of fuel injections, the vehicle speed, the final reduction ratio, and the gear ratio. These state values correspond to examples of the "rotation speed-related value" in the present invention.

In addition, in the above embodiments, vehicle posture control is performed based on the steering angle and the steering speed. In other examples, however, vehicle posture control may be performed based on the yaw rate or the lateral acceleration instead of the steering angle and the steering speed. The steering angle, the steering speed, the yaw rate, and the lateral acceleration correspond to examples of the "steering angle-related value" in the present invention.

REFERENCE SIGNS LIST

1: intake passage
2 (2A to 2D): cylinder
5: throttle valve
10: engine
13: fuel injection valve
14: ignition plug
18: variable intake valve mechanism
20: valve stop mechanism
30: accelerator opening sensor
39: vehicle speed sensor
50: PCM
100: engine system

The invention claimed is:

1. A vehicle control device comprising:
an engine having a plurality of cylinders, the engine configured to switch between a reduced-cylinder operation that stops combustion in some of the cylinders and an all-cylinder operation that performs combustion in all of the cylinders;
an engine control mechanism that controls a generated torque of the engine; and
a power-train control module (PCM) configured to
perform a vehicle posture control for generating vehicle deceleration by controlling the engine control mechanism to reduce the generated torque of the engine upon satisfaction of a condition that a vehicle is traveling, and a change speed of a steering angle of a steering device is greater than a threshold value;
permit an execution of the vehicle posture control only when a rotation speed-related value related to a rotation speed of the engine is more than or equal to a first predetermined value; and
permit an execution of the reduced-cylinder operation of the engine only when the rotation speed-related value is more than or equal to a second predetermined value that is more than the first predetermined value.

2. The vehicle control device according to claim 1, wherein
in a case that a state in which the rotation speed-related value is more than or equal to the first predetermined value and less than the second predetermined value and the vehicle posture control is under execution is changed to a state in which the rotation speed-related value is more than or equal to the second predetermined value, the PCM is configured to limit permission of the execution of the reduced-cylinder operation until the execution of the vehicle posture control ends.

3. The vehicle control device according to claim 2, wherein
in a case that a state in which the rotation speed-related value is more than or equal to the second predetermined value and the vehicle posture control and the reduced-cylinder operation are executed is changed to a state in which the rotation speed-related value is less than the second predetermined value, the PCM is configured to limit transition from the reduced-cylinder operation to the all-cylinder operation until the execution of the vehicle posture control ends.

4. The vehicle control device according to claim 3, wherein
in a case that the rotation speed-related value is more than or equal to a third predetermined value that is more than the second predetermined value, the PCM is configured to permit the number of the cylinders in which combustion is stopped in the reduced-cylinder operation to become larger than when the rotation speed-related value is more than or equal to the second predetermined value and less than the third predetermined value.

5. The vehicle control device according to claim 4, wherein
the PCM is configured to change the second predetermined value according to an accelerator opening-related value related to an opening of an accelerator pedal.

6. The vehicle control device according to claim 5, further comprising:
a sensor configured to detect the rotation speed of the engine, wherein
the PCM is configured to use, as the rotation speed-related value, the rotation speed detected by the sensor.

7. The vehicle control device according to claim 6, further comprising:
a steering angle sensor that detects a steering angle of the steering device, wherein
the PCM is configured to determine that the change speed of the steering angle based on an output of the steering angle sensor.

8. The vehicle control device according to claim 1, wherein
when a state in which the rotation speed-related value is more than or equal to the second predetermined value and the vehicle posture control and the reduced-cylinder operation are executed is changed to a state in which the rotation speed-related value is less than the second predetermined value, the PCM is configured to perform control to limit transition from the reduced-cylinder operation to the all-cylinder operation until the execution of the vehicle posture control ends.

9. The vehicle control device according to claim 8, wherein
in a case that the rotation speed-related value is more than or equal to a third predetermined value that is more than the second predetermined value, the PCM is configured to permit the number of the cylinders in which combustion is stopped in the reduced-cylinder operation to become larger than when the rotation speed-related value is more than or equal to the second predetermined value and less than the third predetermined value.

10. The vehicle control device according to claim 9, wherein
the PCM is configured to change the second predetermined value according to an accelerator opening-related value related to an opening of an accelerator pedal.

11. The vehicle control device according to claim 10, further comprising:
a sensor configured to detect the rotation speed of the engine, wherein
the PCM is configured to use, as the rotation speed-related value, the rotation speed detected by the sensor.

12. The vehicle control device according to claim 11, further comprising:
a steering angle sensor that detects a steering angle of the steering device, wherein
the PCM is configured to determine that the change speed of the steering angle based on an output of the steering angle sensor.

13. The vehicle control device according to claim 1, further comprising:
a sensor configured to detect the rotation speed of the engine, wherein
the PCM is configured to use, as the rotation speed-related value, the rotation speed detected by the sensor.

14. The vehicle control device according to claim 1, further comprising:
a steering angle sensor that detects a steering angle of the steering device, wherein
the PCM is configured to determine the change speed of the steering angle based on an output of the steering angle sensor.

15. A vehicle control device comprising:
an engine having a plurality of cylinders, the engine configured to switch between a reduced-cylinder operation that stops combustion in some of the cylinders and an all-cylinder operation that performs combustion in all of the cylinders;

an engine control mechanism that controls a generated torque of the engine; and a power-train control module (PCM) configured to
perform a vehicle posture control for generating vehicle deceleration by controlling the engine control mechanism to reduce the generated torque of the engine upon satisfaction of a condition that a vehicle is traveling, and a steering angle-related value related to a steering angle of a steering device;

permit an execution of the vehicle posture control when a rotation speed-related value related to a rotation speed of the engine is more than or equal to a first predetermined value; and permit an execution of the reduced-cylinder operation of the engine when the rotation speed-related value is more than or equal to a second predetermined value that is more than the first predetermined value, wherein when the rotation speed-related value is more than or equal to a third predetermined value that is more than the second predetermined value, the PCM is configured to permit the number of the cylinders in which combustion is stopped in the reduced-cylinder operation to become larger than when the rotation speed-related value is more than or equal to the second predetermined value and less than the third predetermined value.

16. The vehicle control device according to claim 15, wherein the PCM is configured to change the second predetermined value according to an accelerator opening-related value related to an opening of an accelerator pedal.

17. The vehicle control device according to claim 16, further comprising:

a sensor configured to detect the rotation speed of the engine, wherein the PCM is configured to use, as the rotation speed-related value, the rotation speed detected by the sensor.

18. A vehicle control device comprising:

an engine having a plurality of cylinders, the engine configured to switch between a reduced-cylinder operation that stops combustion in some of the cylinders and an all-cylinder operation that performs combustion in all of the cylinders;

an engine control mechanism that controls a generated torque of the engine; and a power-train control module (PCM) configured to
perform vehicle posture control for generating vehicle deceleration by controlling the engine control mechanism to reduce the generated torque of the engine upon satisfaction of a condition that a vehicle is traveling, and a steering angle-related value related to a steering angle of a steering device;

permit execution of the vehicle posture control when a rotation speed-related value related to a rotation speed of the engine is more than or equal to a first predetermined value;

permit execution of the reduced-cylinder operation of the engine when the rotation speed-related value is more than or equal to a second predetermined value that is more than the first predetermined value; and change the second predetermined value according to an accelerator opening-related value related to an opening of an accelerator pedal.

19. A vehicle control device comprising:

an engine having a plurality of cylinders, the engine configured to switch between a reduced-cylinder operation that stops combustion in some of the cylinders and n all-cylinder operation that performs combustion in all of the cylinders;

an engine control mechanism that controls a generated torque of the engine; and a power-train control module (PCM) configured to
perform vehicle posture control for generating vehicle deceleration by controlling the engine control mechanism to reduce the generated torque of the engine upon satisfaction of a condition that a vehicle is traveling, and a change speed of steering device is greater than a threshold value;

perform control to execute the vehicle posture control only when a rotation speed-related value related to a rotation speed of the engine is more than or equal to a first predetermined value; and perform control to execute the reduced-cylinder operation of the engine when the rotation speed-related value is more than or equal to a second predetermined value that is more than the first predetermined value.

20. A vehicle control device comprising:

an engine having a plurality of cylinders, the engine configured to switch between a reduced-cylinder operation that stops combustion in some of the cylinders and an all-cylinder operation that performs combustion in all of the cylinders;

an engine control mechanism that controls a generated torque of the engine; and a power-train control module (PCM) configured to
perform a vehicle posture control for generating vehicle deceleration by controlling the engine control mechanism to reduce the generated torque of the engine upon satisfaction of a condition that a vehicle is traveling and a steering angle-related value related to a steering angle of a steering device increases;

perform the vehicle posture control when a value related to a combustion interval of the engine is less than a first predetermined value; and perform the reduced-cylinder operation of the engine when the value related to the combustion interval is less than a second predetermined value that is less than the first predetermined value.

* * * * *